United States Patent

Merkle et al.

[11] 4,231,594
[45] Nov. 4, 1980

[54] PIPE JOINT STRUCTURE

[75] Inventors: Theodor Merkle, Konigsbronn; Bernhard Hausenblas, Landshausen; Hermann Schweickert; Dieter Wengert, both of Heidenheim, all of Fed. Rep. of Germany

[73] Assignee: J. M. Voith GmbH, Heidenheim, Fed. Rep. of Germany

[21] Appl. No.: 903,477

[22] Filed: May 8, 1978

[30] Foreign Application Priority Data

May 9, 1977 [DE] Fed. Rep. of Germany ....... 2720758

[51] Int. Cl.³ .............................................. F16L 27/00
[52] U.S. Cl. ........................................ 285/3; 285/163; 285/404
[58] Field of Search .............. 285/163, 226, 223, 404, 285/402, DIG. 1, 311, 95, 2, 3, 85, 84

[56] References Cited

U.S. PATENT DOCUMENTS

| 2,590,392 | 3/1952 | Feilden | 285/226 |
| 3,066,960 | 12/1962 | Adams | 285/226 X |
| 3,179,447 | 4/1965 | Parr et al. | 285/226 X |
| 3,523,578 | 8/1970 | Nolan, Jr. et al. | 166/355 X |
| 3,961,815 | 6/1976 | Coulboy et al. | 285/DIG. 1 X |

FOREIGN PATENT DOCUMENTS 629161  4/1936  Fed. Rep. of Germany ........... 285/226

*Primary Examiner*—Thomas F. Callaghan
*Attorney, Agent, or Firm*—Lon H. Romanski

[57] ABSTRACT

An arrangement of pipes, as in a riser line for use as in the art of shelf drilling, is shown as having a plurality of pipes connected in end-to-end fashion with a joint operatively interconnecting a pair of adjacent pipes and allowing relative pivotal movement of one of such pair of pipes with respect to the next adjacent of such pair of pipes about an axis extending transversely of that pair of pipes, the axis of pivotal movement of each joint being substantially at right angles to the axis of pivotal movement of each adjacent or succeeding spaced joint.

13 Claims, 6 Drawing Figures

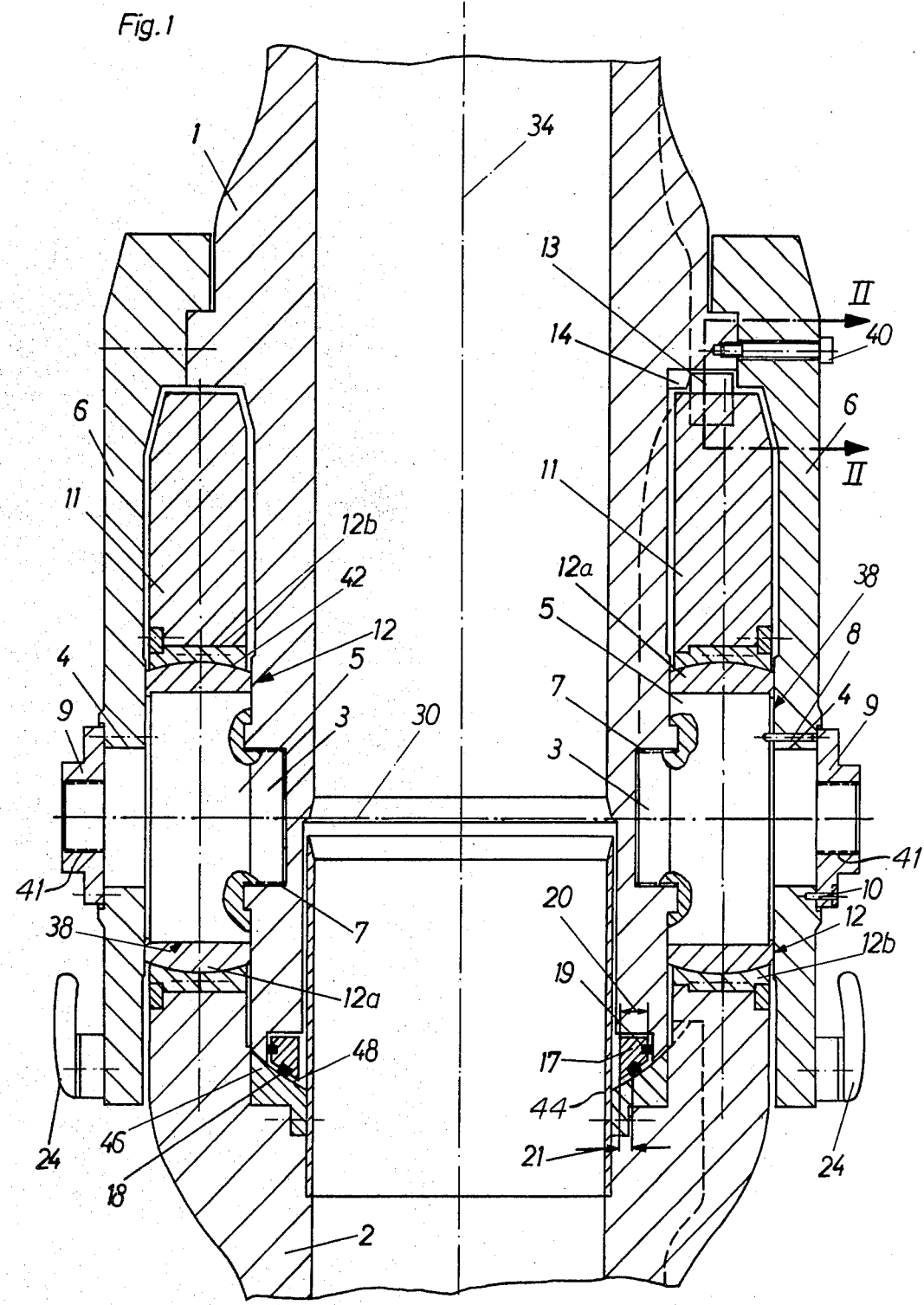

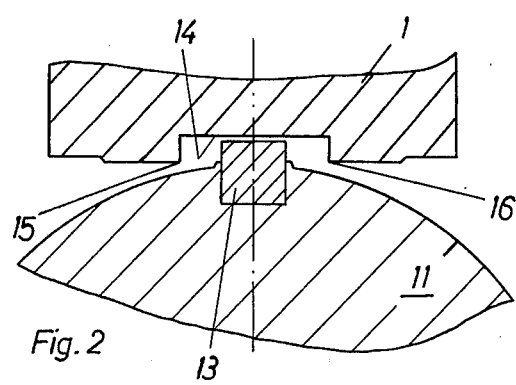
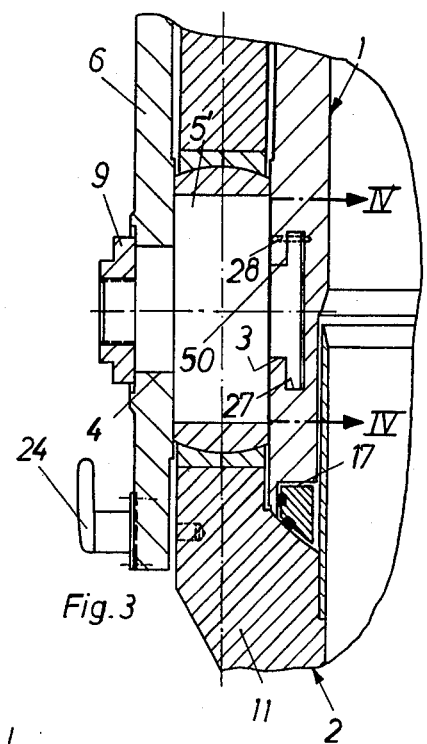
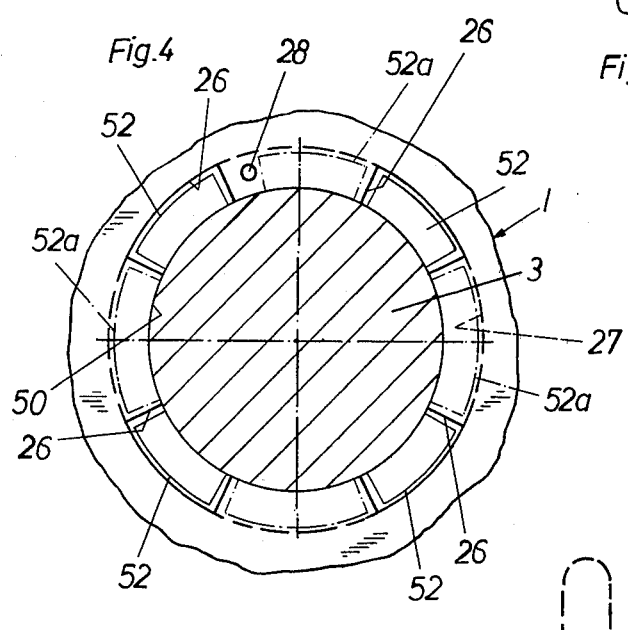
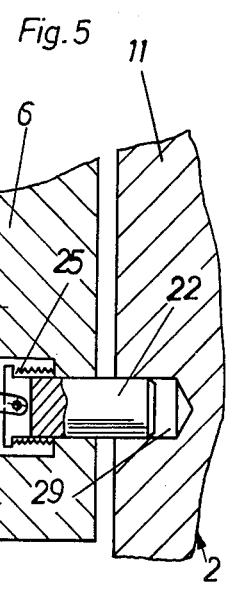
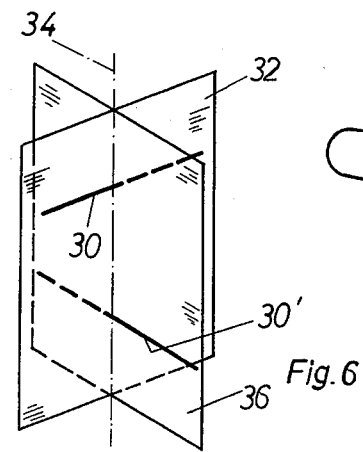

PIPE JOINT STRUCTURE

BACKGROUND OF THE INVENTION

Generally, as is well known in the art or technique of shelf or off-shore drilling for gas and/or oil, riser lines are employed with such riser lines being usually comprised of a plurality of sections or lengths of generally rigid pipe interconnected in end-to-end relationship. Also as is generally well known, such riser lines are often subjected to great stresses and loads occassioned as by bending moments or force couples applied thereto. Such forces, moments and/or couples may be generated by, for example, the riser line being supported as by a ship, floating platform or other vessel and having such floating support, in turn, undergo changes in position or attitude because of wave movements or the like.

Accordingly, the prior art has, heretofore, attempted to provide articulated connections instead of rigid joints as between succeeding pipe sections forming the riser line in order to achieve a reduction in the bending moments otherwise experienced by such a riser line. Specifically, the prior art has suggested the use of ball and socket type joints or rubber (or rubber-like) rings for such articulated connections. Such prior art devices have not been found to be satisfactory. For example, among other problems, ball and socket joints exhibit a significant degree of friction which, in turn, causes abrupt stresses to occur often resulting in damage to the related pipe and overall riser line. Even though the use of prior art intermediate members consisting of rubber (or similar material) rings has the advantage of exhibiting only a comparatively slight degree of friction, such prior art rubber ring members are not capable of carrying loads of a magnitude sufficiently great to make such prior art rubber rings totally satisfactory.

Further, the prior art has heretofore suggested, as generally disclosed in U.S. Pat. No. 3,523,578, the use of cardan joints as the single connection between succeeding pipes instead of a rigid pipe connection or joint. Theoretically, such a cardan pipe joint should achieve a considerable reduction in the bending moment otherwise experienced by the riser line because a cardan joint, if maintained is substantially perfect condition, will not transmit any moments therethrough. However, use of such prior art cardan joints has shown that they have serious disadvantages. For example, a pipe joint, used in an environment such as a riser line, is subjected to very high stresses and accordingly the cardan joint structure must be made physically large enough to withstand such anticipated stresses. However, this, in turn, results in an extremely large diameter of the cardan casing often of a magnitude even possibly precluding its use in a riser line system. Furthermore, there is always the danger (often actually experienced) that the cardan casing will become somewhat (even slightly) deformed thereby making the joint susceptible to total failure. Also, effective and reliable fluid sealing to a cardan joint is, to say the least, difficult.

Accordingly, the invention as herein disclosed and claimed is primarily directed to the solution of the foregoing and other attendant or related problems.

SUMMARY OF THE INVENTION

According to the invention an arrangement of pipes of a riser line or the like, comprises a succession of pipes connected end-to-end to form a riser line, the joint between each pair of pipes allowing relative pivotal movement of one pipe with respect to the adjacent pipe about an axis extending transversely of the pair of pipes, the axis of pivotal movement of each joint being substantially at right angles to the axis of pivotal movement of each adjacent joint.

Inevitably, as proposed by the invention, the division of the mobility of the riser line between two joints (instead of its concentration in a single cardan joint as heretofore proposed by the prior art) and, consequently, also a corresponding two stage elimination of the bending moments, inherently contradicts the beliefs of the average person skilled in the art. Further, such a division between two joints of a function which (according to the prior art belief) can be performed by one joint, with the attendant consequence of, for example, greater weight, appears to be a regressive step in the art and such a division of function also appears to be disadvantageous because of the apparent bending moment loads to which the individual joints are subjected. In other words, what the invention proposes is and has been considered, by those skilled in the art, to be impossible of solving the attendant problems. However, it has been discovered that such disadvantages as may occur are negligible in comparison to the advantages achieved with the invention. Among the advantages of an arrangement according to the invention are: (a) the riser line being, overall, stronger and less susceptible to points of failure; (b) the joints require a smaller overall diameter, with the introduction of force being more direct, than in the case of a cardan joint; (c) the limitation of the pivotal movement of the pipes, when necessary, can be carried out more easily than in the case of a cardan joint; and (d) the bearing friction is comparatively low in magnitude.

In one aspect of the invention, a pipe connection comprises a first pipe, two joint journals arranged opposite one another on the first pipe, each joint journal being mounted in joint bearings, and a second pipe having two joint plates or arms, the two plates or arms being respectively rotatably mounted on the two joint journals.

In another aspect of the invention stop means are provided which limit the relative movement of a first jointed pipe with respect to the second succeeding pipe.

In still another aspect of the invention said stop means is effective to limit such pivotal movement to ±5° from total alignment of two jointed pipes.

In a further aspect of the invention the said stop means comprises a projection provided on one pipe and a cooperating abutment means provided on the other pipe.

In a still further aspect of the invention, said cooperating abutment means comprises a cooperating recess provided on said other pipe with the said projection being generally confined within said recess.

In yet another aspect of the invention the said projection comprises a stop block or shearing block or other functionally similar part which shears off if a force applied thereagainst exceeds a predetermined magnitude. If, for instance, the alternating stresses become too great for the drilling rods, the stop block shears off and the limitation on the pivotal movement is released. In practice this constitutes a predetermined breaking point by means of which the overall riser line is saved from destruction.

In a further aspect of the invention at least one joint journal may be connected to a joint bearing by means of a screw thread.

In another aspect of the invention at least one joint journal may be connected to a joint bearing by means of a bayonet-type fitting.

In yet another aspect of the invention the said bayonet-type fitting is provided with means such as a stop pin. In this manner when the joint journal is fitted into the joint bearing and subsequently rotated in the bayonet-like fitting, a precise and predetermined position of the joint journal is obtained by abutting engagement as with the stop pin.

In a still further aspect of the invention there may be a seal between interconnected ends of the two pipes with such seal comprising an intermediate ring which is placed loosely in position and wherein the area of the upper surface of the ring, which is exposed to the internal pressure within the pipes, is greater than the area of the lower surface of that ring, which is also exposed to the internal pressure within the pipes and wherein the said lower surface of the ring is provided with a sealing ring. As a consequence, very satisfactory sealing is achieved because of the greater downward pressure force thereby always causing the seal to automatically readjust itself.

In another aspect of the invention arresting pins may be provided for preventing the relative movement of one pipe relative to the other pipe during transportation.

In a further aspect of the invention the said arresting pins are each provided with a toggle joint and the toggle joints are so formed that the arresting pins are automatically released by the action of the drill table when the riser line is introduced into the associated drill table. This avoids a situation in which the action of the arresting pins could be maintained, for example, as a result of negligence of the drilling personnel, thereby preventing the related joint from becoming pivotal.

Other general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted:

FIG. 1 is a longitudinal cross-sectional view of a pair of pipes, fragmentarily illustrated, with a connection, operatively pivotally interconnecting such pipes, embodying teachings of the invention;

FIG. 2 is a fragmentary cross-sectional view taken generally on the plane of line II—II of FIG. 1 and looking in the direction of the arrows;

FIG. 3 is a view similar to a fragmentary portion of FIG. 1, and in reduced scale, illustrating a modification of the invention;

FIG. 4 is a fragmentary cross-sectional view, in relatively enlarged scale, taken generally on the plane of line IV—IV of FIG. 3 and looking in the direction of the arrows;

FIG. 5 is a cross-sectional view, in relatively enlarged scale of a portion of the structure shown in either FIGS. 1 or 3 and illustrating in greater detail arresting pin means employable in the invention; and FIG. 6 is a somewhat schematic drawing illustrating, as by intersecting planes, the relative relationship of the pivotal axes of two spaced joint structures situated as at opposite ends of a generally intermediate pipe structure and respectively pivotally interconnecting upper and lower succeeding pipe sections to the intermediate pipe structure.

DETAILED DESCRIPTION OF THE PREFERRED EMBODIMENT

Referring now in greater detail to the drawings, FIG. 1 illustrates fragmentary portions of serially connected pipes or conduits 1 and 2 arranged in general end-to-end relationship and operatively interconnected to each other by pivotal joint connecting means, embodying teachings of the invention, as to have a corresponding pivotal axis 30 lying in the plane of the drawing. Similar pivotal joint connecting means may be provided at the respective other ends of pipes 1 and 2; such similar pivotal joint connecting means, in the preferred embodiment, would be rotated or offset with respect to the axis 30 of FIG. 1 as to have the axis 30' thereof rotated or offset, generally, 90° with respect to the position of axis 30. This is schematically illustrated, in somewhat simplified and perspective form, in FIG. 6 wherein pivotal axis 30 is shown lying in a plane 32 which corresponds to the plane of the drawing in FIG. 1. Plane 32 is shown as passing through the longitudinal axis 34 of pipes 1 and 2 while pivotal axis 30 is shown perpendicular to axis 34. A second plane 36 perpendicular to plane 32 and passing through axis 34 contains axis 30' which is also shown perpendicular to longitudinal axis 34. Accordingly, the particular pivotal joint connecting means defining pivotal axis 30 permits the relative pivotal movement of the pipe sections at generally either side of pivotal axis 30 to pivot about such axis 30 while the pivotal joint connecting means defining pivotal axis 30' permits the relative pivotal movement of the pipe sections at generally either side thereof to pivot about such axis 30'.

The connecting means, in FIG. 1, is illustrated as comprising two bearing means 38 functionally aligned with each other and disposed at opposite sides of pipe 1 generally near the end thereof. In the preferred embodiment, each bearing or trunnion means 38 comprises a first bearing support portion 3 connected to the pipe 1 and a second bearing support portion 4 also operatively connected to pipe 1 as through its connection with a connecting or support plate member 6. As is shown, bearing supports 3 and 4 carry a relatively enlarged bearing portion 5, which may be of cylindrical configuration. In the preferred embodiment, bearing support portion 3 is secured to pipe 1 by threadable engagement therewith as by coacting thread means generally depicted at 7. As is evident in FIG. 1, preferably separate and generally opposed support members or plates 6 are provided and the upper-illustrated ends thereof may be suitably secured to pipe 1 as by, for example, a plurality of screws or bolts one of which is typically illustrated at 40.

A bolt or keying member 8 extends from each support 6 and into a portion of each of the bearing means 38. Preferably, as illustrated, the location of such locking or keying means 8 is such as to cause it to operatively engage the axially outer end of the enlarged bearing portion or body 5. The purpose of such means 8 is to prevent the bearing means 38 from rotating with respect to either pipe 1 or support 6 thereby precluding undesired disengagement therebetween. As also shown in FIG. 1, each of the bearing support portions 4 are provided with an externally threaded extension 41 which, in turn, is threadably engaged with a nut 9. Each nut 9 is also preferably provided with suitable keying or locking means 10 which may actually take the form of a threaded member or pin extending through the related nut 9 and operatively engaging the associated support member 6, as typically illustrated at the right side of FIG. 1. Further, as also generally depicted at the right side of FIG. 1, the relative location of locking means 8 and the relative size of nut 9 are preferably of such dimensions as to result in nut 9 effectively blocking the availability for withdrawal of locking means 8 once nut 9 is suitably secured.

The generally functionally juxtaposed or adjacent pipe 2 is provided with joint plate-like portions or extensions 11 which are spaced from each other as to also be disposed on opposite sides of pipe 1. A bearing assembly 12, comprised as of an inner bearing member 12a and an outer bearing member 12b, is carried by each of the extensions 11 as to be in operative pivotal engagement with respective trunnion portions 5. As generally typically depicted at 42, each of the bearing means 12 is preferably provided with a spherical surface portion in order to avoid the occurrence of localized or edge-type pressures.

Extensions or plate-like portions 11 may define a yoke-like configuration at the upper-illustrated end of pipe 2 and, preferably, are integrally formed with the main body of such pipe 2. One or both of the extensions or connecting arms 11 may be provided with means to limit the relative pivotal movement of pipes 1 and 2. For purposes of illustration only one such plate or arm 11 is shown in FIG. 1 as being provided with such limiting means. As also shown in FIG. 2, such pivot limiting means is shown as comprising a stop block or shearing block 13 which is retained as by the end of the related arm 11 and contained as within a cooperating recess 14 formed in or by a generally juxtaposed portion of pipe member 1.

Preferably the block 13 is made of suitable material such as, for example, grey cast iron so that in case of danger, as when a predetermined force is exceeded, the block 13 can shear off at the sharp edges 15 or 16 of the recess 14, as best seen in FIG. 2.

As shown at the generally lower end of FIG. 1, an annular ring 17 is generally loosely situated between portions of pipes 1 and 2 and about an inner tubular sleeve-like member 44. The ring 17 is, in turn, provided as with annular or ring seals 18 and 19 with seal 18 being illustrated somewhat lower disposed while ring 19 is generally laterally disposed. The total area of the upper surface of ring 17, as indicated at 20, is greater than the lower surface, which is exposed to the internal pressure as indicated at 21; therefore, even though both of such surface areas are exposed to the internal pressure of the pipes 1 and 2, the net effective force generated by such pressure is directed downwardly thereby continually causing sealed seated engagement of the ring 17 and lower annular seal 18 against the cooperating annular seal seating member 46 which, preferably, has an inner surface portion 48, of generally spherical configuration, operatively engaging the seal 18. Accordingly, as a result of such internal pressure, it can be seen that as relative pivotal motion is experienced between pipes 1 and 2, seal ring 17 and annular seals 18 and 19 are automatically adjusted into continuing sealing engagement. Seal 19 may, of course, be of the type wich inherently is brought into sealed engagement as by a differential in pressure existing thereacross.

Referring to both FIGS. 1 and 5, an arresting or holding pin 22 is preferably operatively carried by each of the support plate or members 6, for operatively engaging a cooperating portion of the related extension or arm 11 to prevent articulation or pivotal movement about the joint axis as during transportation of the pipe and joint assembly. As typically illustrated in FIG. 5, a bore or suitable receiving aperture 29 is effective to slidably receive therein one end of holding or arresting pin 22 which is, in turn, axially slidably carried in the generally swingable end of support member 6. The other end of pin 22 is secured to a toggle linkage 23 which is, in turn, operatively connected to an actuating handle or lever 24. When lever 24 is in its solid-line position depicted in FIG. 5, the pin 22 is inserted into bore 29 of the associated joint plate or arm 11 thereby locking the jointed connection against pivotal movement. As the riser line, comprised as of a plurality of joint-connected pipes, is introduced and passed through the related drill table, each lever 24 is automatically deflected or moved upwardly to the position depicted in hidden line in FIG. 5 (and the corresponding solid line position depcited in FIG. 1) thereby causing withdrawal of each associated locking pin 22 from its cooperating bore 29 and permitting relative pivotal movement of the pipes 1 and 2 at such related pivotal joint structure. Preferably, a spring 25 is provided, as about each arresting or holding pin 22, in order to exclude any possibility that the lever 24, once moved to its unlocked position, may subsequently move downwardly (to the solid line position of FIG. 5) and thereby lock the jointed connection of a portion of the riser line which has already passed through the drill table.

FIGS. 3 and 4 illustrate a modification of the invention. Those elements which are like or similar to those of FIGS. 1, 2 and 5 are identified with like reference numbers and only to the extent considered necessary.

Referring in greater detail to FIGS. 3 and 4, the bearing support 3, instead of employing thread means as generally depicted at 7 of FIG. 1, employs a bayonet type locking means. More specifically, the aperture means 50 supporting bearing support 3 is provided with a plurality of generally radially extending angularly spaced arcuate slots 26 which communicate with an annular recess or undercut 27. The bearing support 3, in turn, is provided with a plurality of generally radially extending angularly spaced arcuate segments or sectors 52 which are respectively accommodated by the slots 26, as generally depicted in FIG. 4. When the bearing support 3 and sectors 52 are moved axially inwardly a sufficient distance, sectors 52 come into registry with annular recess or undercut 27 at which time the bearing 5 and bearing support 3 are rotated about their axis causing the sectors 52 to go out of alignment with slots 26 and into alignment with the portions of pipe 1 generally angularly between such slots 26 and as generally depicted at 52a of FIG. 4. Preferably an abutment or stop pin member 28 is provided as to extend through the annular recess or undercut 27 as to thereby serve as a limiting means for the rotation of bearing 5 and bearing support 3. That is, when bearing support 3 and sectors 52 are rotated to a locking position as described, the end of one of the sectors 52 will abut against pin 28, as generally depicted in FIG. 4, thereby indicating a rotation thereof sufficient to achieve a locked condition.

As is evident, the invention provides an arrangement of pipes, as of a riser line, for use as in the art or technique of shelf drilling, comprising a succession of pipes connected end-to-end to form a riser line, the joint between each pair of pipes allowing relative pivotal movement of one pipe with respect to the adjacent pipe about an axis extending transversely of the pair of pipes, the axis of pivotal movement of each joint being substantially at right angles to the axis of pivotal movement of each succeeding joint.

Alternate joints are thus offset as to have the pivotal axes thereof rotated 90° with respect to each other. As a consequence, bending of the riser pipe assembly occurs approximately in the form of a catenary curve. A bending moment can, of course, act in one direction on each individual joint, however, when the individual joints are not arranged too far away from each other, the bending moments are substantially eliminated. Accordingly and preferably for this purpose, pairs of joint assemblies, each consisting of two joints (as disclosed) at a relatively short distance from each other, are arranged at relatively long intervals within the overall riser line according to the requirements of such riser line. This can be accomplished either by an intermediate pipe section or by two normal riser pipes located one after the other and jointed according to the invention.

Although only a preferred embodiment and a modification of the invention has been disclosed and described, it is apparent that other embodiments and modifications of the invention are possible within the scope of the appended claims.

What is claimed is:

1. A jointed pipeline, comprising a succession of at least first second and third pipe members, first pivotal joint means operatively interconnecting one end of said first pipe member to a first end of said second pipe member, second pivotal joint means operatively interconnecting, a second end of said second pipe member to a first end of said third pipe member, said first pivotal joint means defining a first fixed pivotal axis extending transversely of said first and second pipe members for allowing said first and second pipe members to pivotally rotate thereabout relative to each other, said second pivotal joint means defining a second fixed pivotal axis extending transversely of said second and third pipe members for allowing said second and third pipe members to pivotally rotate thereabout relative to each other, said first and second pivotal axes being respectively contained in first and second planes which are substantially normal to each other, and stop means, said stop means being effective to limit the relative pivotal movement of said first pipe member relative to said second pipe member, said stop means comprising abutment type shear means, said shear means being effective to become sheared and further ineffective as abutment means when a force applied thereagainst exceeds a predetermined magnitude which magnitude is less than that required to shear said first pivotal joint means.

2. Apparatus according to claim 1 wherein said first pivotal joint means comprises first and second joint journals respectively situated on and carried by said first pipe member opposite to each other and in alignment with each other, and wherein said second pipe comprises first and second joint plate portions, said first and second joint plate portions being respectively pivotally secured to said first and second joint journals.

3. Apparatus according to claim 1 wherein said stop means comprises a projection carried by one of said first and second pipe members and cooperating recess means carried by the other of said first and second pipe members, said projection being generally confined to angular movement within the confines of said recess means generally about said first fixed pivotal axis.

4. Apparatus according to claim 3 and further comprising first and second support portions for respectively supporting said first and second joint journals, said first and second support portions being carried by said first pipe member as to have said first plate portion generally interleaved between said first pipe member and said first support portion and as to have said second plate portion generally interleaved between said first pipe member and said second support portion, and wherein at least said first joint journal is threadably secured to said first pipe member.

5. Apparatus according to claim 3 and further comprising first and second support portions for respectively supporting said first and second joint journals, said first and second support portions being carried by said first pipe member as to have said first plate portion generally interleaved between said first pipe member and said first support portion and as to have said second plate portion generally interleaved between said first pipe member and said second support portion, and wherein at least said first joint journal is operatively connected to said first pipe member by associated bayonet-type fitting means.

6. Apparatus according to claim 5 wherein said bayonet-type fitting means comprises a generally radially extending portion carried by said first joint journal and insertable within cooperating recess means formed in said first support portion, and further comprising second stop means situated generally within said recess means for limiting the degree of movement of said radially extending portion relative to said recess means.

7. Apparatus according to claim 1 and further comprising sealing means situated generally between said one end of said first pipe member and said first end of said second pipe member, said sealing means comprising an intermediate ring loosely confined generally between said one and first ends of said first and second pipe members, said intermediate ring having first and second surface portions exposed to the internal pressure within said pipe members, said first and second surface portions having different effective areas thereby resulting in a pressure force differential operative against said intermediate ring to urge said intermediate ring in a first direction, and a sealing ring carried by said intermediate ring, said sealing ring being positioned as to be urged into sealing engagement with associated seal seating surface means by the action of said pressure force differential.

8. Apparatus according to claim 3 and further comprising selectively engagable and disengagable arresting means effective when engaged for preventing all relative pivotal movement of said first and second pipe members generally about said first fixed pivotal axis.

9. Apparatus according to claim 8 wherein said arresting means comprises pin means operatively engageable with both said first and second pipe members, said pin means being movable in a direction generally transverse to said first and second pipe members.

10. A jointed pipeline, comprising a succession of at least first second and third pipe members, first pivotal joint means operatively interconnecting one end of said first pipe member to a first end of said second pipe member, second pivotal joint means operatively interconnecting a second end of said second pipe member to a first end of said third pipe member, said first pivotal joint means defining a first fixed pivotal axis extending transversely of said first and second pipe members for allowing said first and second pipe members to pivotally rotate thereabout relative to each other, said second pivotal joint means defining a second fixed pivotal axis extending transversely of said second and third pipe members for allowing said second and third pipe members to pivotally rotate thereabout relative to each other, said first and second pivotal axes being respectively contained in first and second planes which are substantially normal to each other, said first pivotal joint means comprising first and second joint journals respectively situated on and carried by said first pipe member opposite to each other and in alignment with each other, said second pipe comprising first and second joint plate portions, said first and second joint plate portions being respectively pivotally secured to said first and second joint journals, and arresting means effective for preventing relative pivotal movement of said first and second pipe members, said arresting means comprising pin means at times operatively engageable with both said first and second pipe members, and toggle means operatively connected to said pin means, said toggle means being effective to move said pin means into and out of said operative engagement with both of said first and second pipe members.

11. Apparatus according to claim 10 wherein said toggle means comprises an actuating portion extending generally radially of said first and second pipe members, and wherein said actuating portion is adapted to be operatively engaged by associated drill table structure means when said first and second pipe members are being introduced into said drill table for automatically actuating said toggle means and terminating the said engagement of said pin means with both said first and second pipe members thereby enabling relative pivotal movement thereof about said first pivotal axis.

12. A jointed pipeline, comprising a succession of at least first and second pipe members, pivotal joint means operatively interconnecting one end of said first pipe member to a first end of said second pipe member, said pivotal joint means defining a fixed pivotal axis extending transversely of said first and second pipe members for allowing said first and second pipe members to pivotally rotate thereabout relative to each other, and stop means, said stop means comprising first and second stop portions respectively carried by said first and second pipe members as to be respectively rotatable with said first and second pipe members and relatively rotatable with respect to each other as said first and second pipe members experience relative pivotal rotation about said fixed pivotal axis, said first and second stop portions being effective upon being rotatably brought into operative abuting engagement with each other to limit the relative pivotal movement of said first pipe member relative to said second pipe member about said fixed pivotal axis, said first stop portion comprising abutment type shear means, said shear means being of lesser shear strength than said second stop portion as to thereby be effective to become sheared by said second stop portion and further ineffective as a stop portion when a force resulting from the relative pivotal movement of said first pipe member relative to said second pipe member and applied to said shear means by said second stop portion exceeds a predetermined magnitude.

13. A jointed pipeline, comprising a succession of at least first and second pipe members, pivotal joint means operatively interconnecting one end of said first pipe member to a first end of said second pipe member, said pivotal joint means defining a fixed pivotal axis extending transversely of said first and second pipe members for allowing said first and second pipe members to pivotally rotate thereabout relative to each other, and arresting means effective for preventing relative pivotal movement of said first and second pipe members, said arresting means comprising pin means at times operatively engageable with both said first and second pipe members, and toggle means operatively connected to said pin means, said toggle means being effective to move said pin means into and out of said operative engagement with both of said first and second pipe members.

* * * * *